United States Patent [19]

Takeuchi et al.

[11] Patent Number: 4,772,097

[45] Date of Patent: Sep. 20, 1988

[54] LIGHT CONTROLLING SHEET

[75] Inventors: Noboru Takeuchi, Aichi; Masakazu Goto, Konan; Hiroaki Takahashi, Gifu; Takeshi Kojima, Nagoya, all of Japan

[73] Assignee: Kabushiki Kaisha Tokai Rika, Aichi, Japan

[21] Appl. No.: 918,903

[22] Filed: Oct. 15, 1986

[30] Foreign Application Priority Data

Sep. 20, 1986 [JP] Japan ................................ 61-222466
Sep. 25, 1986 [JP] Japan ................................ 61-227535

[51] Int. Cl.[4] ................................ G02B 27/00
[52] U.S. Cl. ................................ 350/319; 350/276 R
[58] Field of Search .................... 350/319, 322, 276 R, 350/276 SL, 103, 164

[56] References Cited

U.S. PATENT DOCUMENTS 3,380,817 4/1968 Gardner ................................ 350/276
3,642,557 2/1972 Warp ................................ 350/276 R
4,066,332 1/1978 Kato et al. ................................ 350/276 R
4,070,100 1/1978 Akiyoshi ................................ 350/276 R
4,342,821 8/1982 Galves et al. ................................ 350/276 SL
4,506,953 3/1985 Shimizu et al. ................................ 350/276 R
4,560,251 12/1985 Mürjahn ................................ 350/276 R

FOREIGN PATENT DOCUMENTS 139250 10/1980 Japan .

*Primary Examiner*—John K. Corbin
*Assistant Examiner*—Loha Ben
*Attorney, Agent, or Firm*—Birch, Stewart, Kolasch & Birch

[57] ABSTRACT

The present invention is directed to a light controlling sheet in use for optical indicators which comprises louver elements including an arbitrary pattern of walls which are parallel to each other and so opaque as to absorb incident light; transparent layers for permitting the incident light to pass therethrough and light reflection layers for reflecting the incident light. The transparent layers and the light reflection layers are mutually interposed between the walls of the louver element. The oblique light from the light souce strikes the side surfaces of the walls, while the substantially parallel light from the light source passes through the transparent layers toward the observer. The extraneous light is reflected at the front surface of the light reflection layers so that the light controlling sheet is bright and stands out clearly.

5 Claims, 3 Drawing Sheets

LIGHT CONTROLLING SHEET

BACKGROUND OF THE INVENTION

1. Field of the invention

The present invention generally relates to a light controlling sheet in use for the optical indicators, and more particularly, to a light controlling sheet for permitting only the substantially parallel light to pass therethrough.

2. Description of background art

Conventionally, the light controlling sheet of a type, as described above has been utilized as an indication face member for covering a front face of, for example, a switch mounted on an instrument panel of a motor vehicle. In the switch with the light controlling sheet as described above, a light source i.e. a lamp, is arranged in the switch housing. When the lamp is illuminated at night, the light passes through the light controlling sheet toward a driver so that the driver can visually recognize the position of the switch.

Referring to FIG. 1, a typical type of light controlling sheet C is illustrated which comprises a louver element 2. A transparent base film 4 is generally cemented to the rear surface of the louver element 2. The louver element 2 includes a plurality of walls 2*a* which are arranged parallel to each other on the transparent base film 4 and which may be formed in arbitrary patterns, such as honeycomb, stripe and grid patterns. The louver element 2 is so opaque that the light striking thereto can be absorbed therein. When the above light controlling sheet C is applied to an optical indicator, for example a front face of a switch mounted on an instrument panel of a motor vehicle, a light source (not shown) is arranged behind the transparent base film 4. The oblique light $L_1$ and $L_2$ emitted from the light source strikes the surface of the walls 2*a* of the louver element 2 to be absorbed therein. In the meanwhile, the substantially parallel light $L_0$ can pass through the base film 4 and the spaces between the adjacent walls 2*a*. Thus, only the substantially parallel light reaches the eyes of the observer. In addition, in the above construction, the base film 4 can be removed when the walls 2*a* are connected to each other.

In the meanwhile, the walls 2*a* of the louver element 2 are opaque or dark, as described above, in order to absorb the incident light. Therefore, when the light controlling sheet C is not illuminated by a lamp as the light source during the daytime, the indication face comprising the light controlling sheet is not attractive. Therefore, the observer can not easily recognize the position of the indication face such as a front indication face of the switch.

SUMMARY OF THE INVENTION

It is, therefore, an object of the present invention to provide a light controlling sheet of a type, as described above, which is more attractive or stands out clearly even when it is not illuminated by the lamp from behind and also maintains the essential function of permitting only the substantially parallel light from the light source to pass therethrough.

In accomplishing this and other objects, according to one preferred embodiment of the present invention there is provided a light controlling sheet in use for optical indicators which comprises louver element means including an arbitrary pattern of walls which are parallel to each other and so opaque as to absorb incident light; transparent layers for permitting the incident light to pass therethrough; and light reflection layers for reflecting the incident light. The transparent layers and the light reflection layers are mutually interposed between the walls of the louver element means.

When the light controlling sheet is used for the indication face member of an optical indicator, the oblique light emitted from the light source, which is located behind the light controlling sheet, strikes the side surfaces of the walls of the louver element and is absorbed therein, while the substantially parallel light from the light source passes through the transparent layers toward the observer. When the light controlling sheet is not illuminated by the light source during the daytime, the extraneous light is reflected at the front surface of the light reflection layers. Accordingly, the light controlling sheet as an indication face member is highlighted and stands out clearly, resulting in that the observer can easily recognize the position of the indication face even during daytime.

According to another preferred embodiment of the present invention, there is provided a light controlling sheet in use for optical indicators which comprises louver element means including an arbitrary pattern of walls which are parallel to each other and so opaque as to absorb incident light; transparent layers for permitting the incident light to pass therethrough which are defined between the walls of said louver element; and a light reflection layer which has the same pattern as that of the walls of said louver element and which is adhered to front surface of said louver element such that both patterns thereof conform to each other.

With the latter embodiment, since the light reflection layer is mounted on the front surface of the louver element, the substantially parallel light from the light source is not shielded by the light reflection layer. Therefore, more bright light can be obtained through the light controlling sheet.

BRIEF DESCRIPTION OF THE DRAWINGS

The above objects and features of the present invention will become apparent from the following description taken in conjunction with the preferred embodiment thereof, with reference to the accompanying drawings, in which.

DETAILED DESCRIPTION OF THE INVENTION

Figure 1:
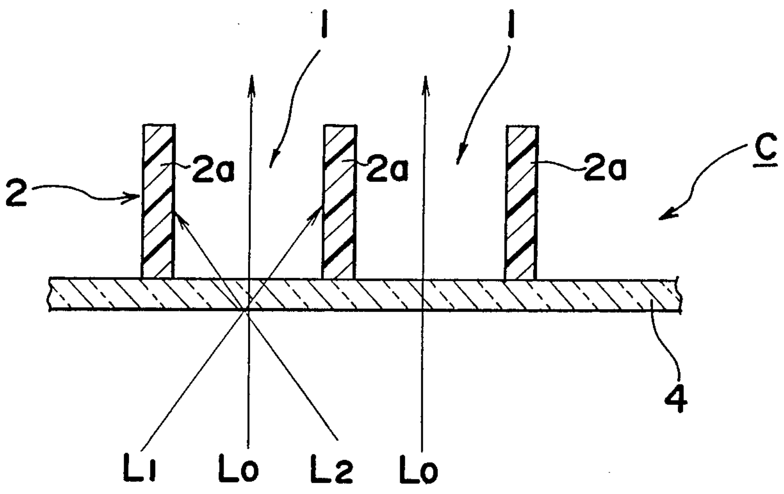
Fig. 1 PRIOR ART
FIG. 1 is a sectional view of a conventional light controlling sheet, as previously described.

Before the description of the present invention proceeds, it is to be noted that like parts are designated by like reference numerals and symbols throughout the several views of the accompanying drawings.

Figure 2:
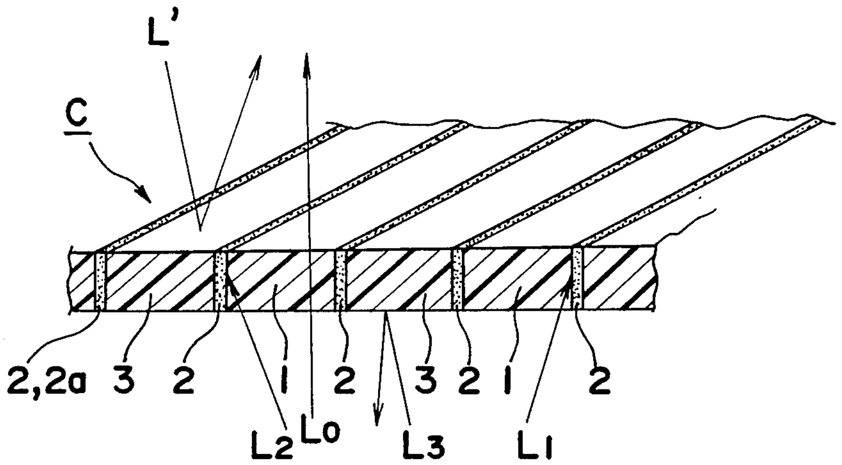
FIG. 2 is an perspective view showing a light controlling sheet according to a preferred embodiment of the present invention.

Referring to FIG. 2, there is shown a light controlling sheet C according to a first embodiment of the present invention. The sheet C comprises a plurality of louver elements 2 which are respectively composed of thin films and form strip patterns equally spaced and parallel to each other. Transparent layers 1 and light reflection layers 3 are mutually interposed between the adjacent louver elements 2.

The louver elements 2 are respectively treated so as to absorb the light. The reflection layers, respectively, include for example, white pigment. Therefore, when the sheet C is illuminated by a light source (not shown), the oblique light $L_1$ and $L_2$ from a light source can be absorbed in the opaque louver elements 2. The substantially parallel light $L_0$ can pass through the transparent layers 1. Thus, the observer can easily recognize the position of the illuminated face, i.e. the front indication face. The light $L_3$ striking the rear surface of the light reflection layers 3 is reflected. In the daytime, the extraneous light L' striking the front surface of the sheet C is reflected at the front surface of the light reflection layers 3. Accordingly, if the light reflection layers 3 include the white pigment, white reflected light reaches the eyes of the observer. Therefore, the observer can easily recognize the position of the indication face.

Figure 3:
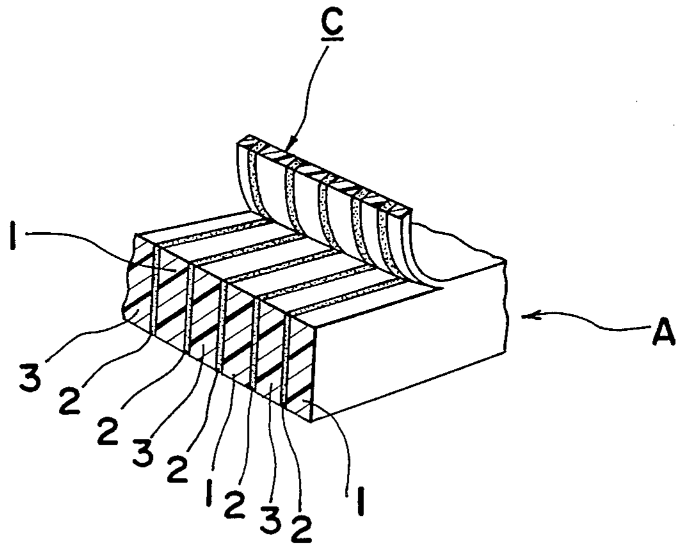
FIG. 3 is a perspective view of a plate as an intermediate material showing a method of making the light controlling sheet as shown in FIG. 2.

The light controlling sheet C according to the above first embodiment can be easily made by the following method, which will be described herebelow with reference to FIG. 3.

First, a thick plate A is constructed as an intermediate material which has lamination layers comprising the louver elements 2, transparent layers 1 and light reflection layers 3. Next, the thick plate A is sliced so that a plurality of light controlling sheets C having desired thickness are obtained.

Figure 4:
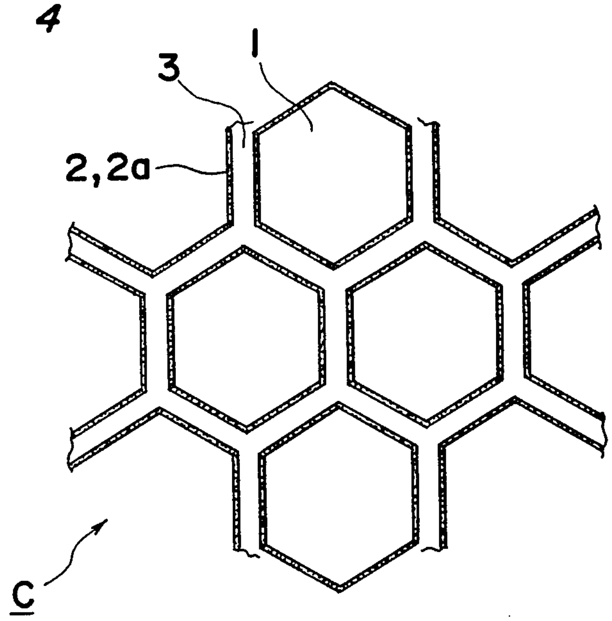
FIG. 4 is a face view showing a light controlling sheet according to a second embodiment of the present invention.

Referring to FIG. 4, there is shown another light controlling sheet C according to a second embodiment of the present invention. In this embodiment, the light reflection layer 3 forms a skeleton structure of a honeycomb pattern. The louver elements 2 are respectively formed along the side surfaces of the hexagon cells of the light reflection layers. The hexagon spaces surrounded by the louver elements 2 define the transparent air layers 1.

In the second embodiment, the substantially parallel light from the light source can pass through the transparent air layers 1, while the oblique light can be absorbed in the louver elements 2. The extraneous light can be reflected at the front surface of the light reflection layer 3.

Alternatively, the positions of layers 1, 2 and 3 may be exchanged with each other. For example, the hexagon spaces surrounded by the louver elements 2 can be fulfilled with reflection material to form the light reflection layers. On the contrary, the honeycomb skeleton structure can be made of transparent material. The sheet C according to the second embodiment can easily be made by for example, a method of photoetching.

Figure 5:
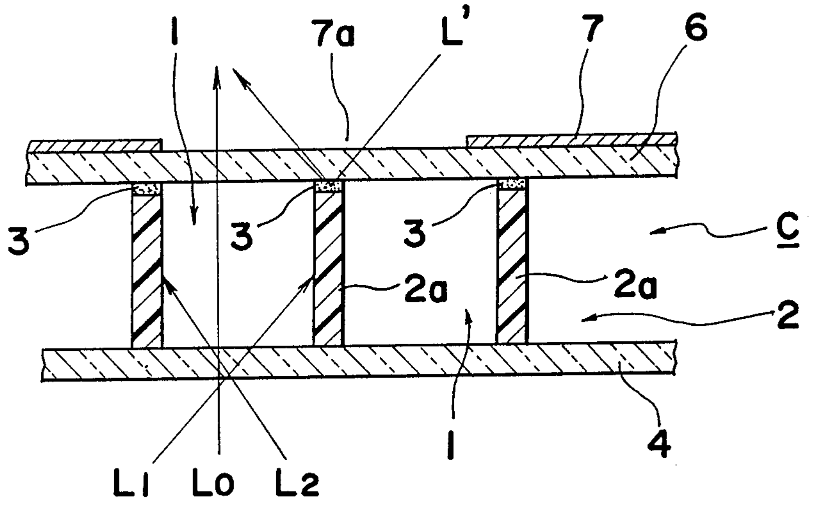
FIG. 5 is a sectional view of a light controlling sheet according to a third embodiment of the present invention.
Figure 6:
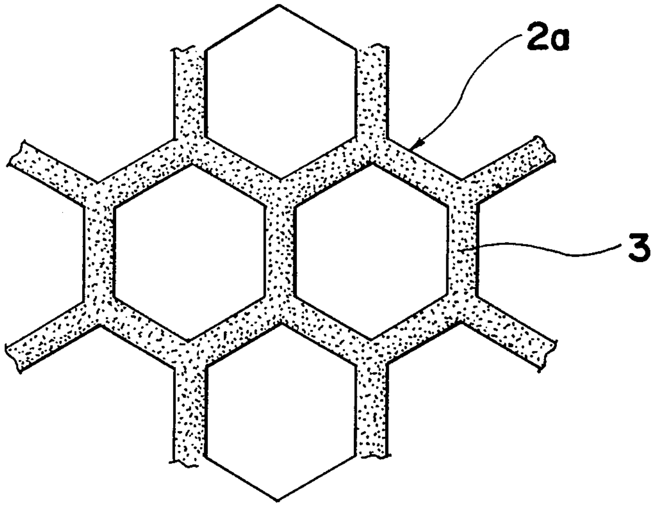
FIG. 6 is a face view of a louver element provided with a reflection layer which is used for the light controlling sheet as shown in FIG. 5.

Referring to FIGS. 5 and 6, there is shown another light controlling sheet C according to a fourth embodiment of the present invention. In this fourth embodiment, the reflection layer 3 is formed on a front surface of the walls 2 of the louver element 2. As shown in FIG. 6, both the louver element 2 and the light reflection layer 3 have respective honeycomb patterns. A transparent base film 4 is adhered to the rear surface of the louver element 2, while a transparent front film 6, which is colored, is adhered to the front surface of the louver element 2 with the light reflection layer 3 interposed therebetween. On the front surface of the front film 6, is mounted a light shielding cover 7 which has a predetermined opening 7*a* representing a desired configuration.

With the fourth embodiment, the substantially parallel light $L_0$ from the light source (not shown) passes through the transparent film 4, the air layer 1 between the walls 2a of the louver element 2, the colored transparent film 6 and the opening 7*a* of the cover 7. Accordingly, the light $L_0$ emitted from the light controlling sheet C is colored. Needless to say, the oblique light $L_1$ and $L_2$ is absorbed in the side surfaces of the walls 2*a*. During the daytime, the extraneous light L' is reflected at the light reflection layer 3. The reflected light L' is colored because it passes through the colored film 6. Accordingly, the opening 7*a* of the cover is attractive and stand out clearly even during the daytime, so that the observer can easily recognize the position of the indication face.

Although the present invention has been fully described by way of example with reference to the accompanying drawings, it is to be noted, here, that various changes and modifications will be apparent to those skilled in the art. Therefore, unless otherwise such changes and modifications depart from the scope of the present invention, they should be construed as included therein.

What is claimed is:

1. A light controlling sheet for use in optical indicators comprising:
louver element means including an arbitrary pattern of walls which are substantially parallel to each other and constructed of an opaque material for absorbing incident light;
transparent layers for permitting incident light to pass therethrough; and
light reflection layers for reflecting incident light;
said transparent layers and the light reflection layers being mutually arranged in a side-by-side arrangement adjacent to each other with a wall of said louver element means being interposed therebetween.

2. A light controlling sheet according to claim 1, wherein said transparent layers are constructed of transparent material for filling corresponding spaces between the walls of said louver element means and being adjacent to corresponding spaces filled by said light reflection layers.

3. A light controlling sheet according to claim 1, wherein said transparent layers are air layers.

4. A light controlling for use for optical indicators comprising:
louver element means including an arbitrary pattern of walls which are substantially parallel to each other and constructed of an opaque material for absorbing incident light;
transparent layers for permitting the incident light to pass therethrough, said transparent layers being defined between the walls of said louver element means, and
a light reflection layer having the same pattern as said walls of said louver element means, said light reflection layer being adhered to a front surface of said louver element means so that both patterns thereof conform to each other.

5. A light controlling sheet according to claim 4, and further including a colored transparent film adhered to the front surface of said louver element means with said light reflection layer interposed therebetween.

* * * * *